D. P. BONNELL.
Flouring Apparatus.
No. 245. Reissued July 5, 1853.
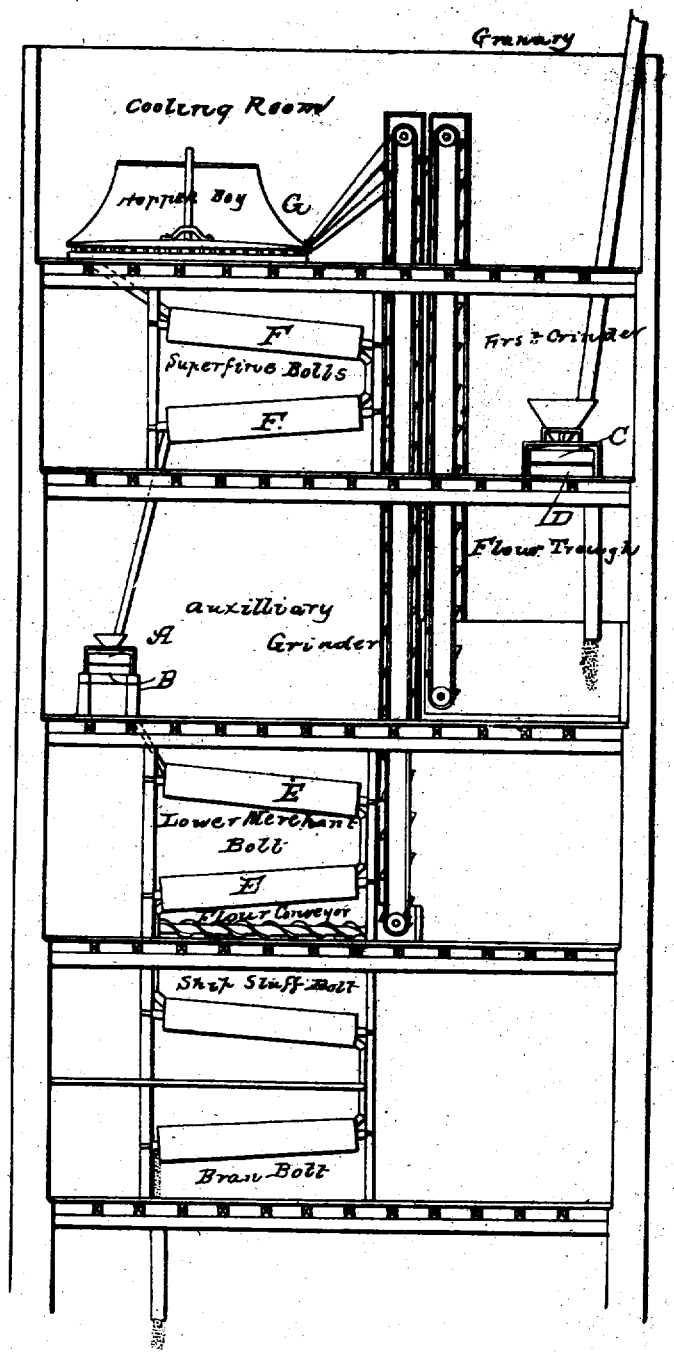

UNITED STATES PATENT OFFICE.

DAVID P. BONNELL, OF TECUMSEH, MICHIGAN.

PROCESS OF FLOURING.

Specification forming part of Letters Patent No. 6,648, dated August 14, 1849; Reissue No. 245, dated July 5, 1853.

*To all whom it may concern:*

Be it known that I, DAVID P. BONNELL, of Tecumseh, in the county of Lenawee and State of Michigan, have invented or discovered a new and useful Improvement in the Process of Manufacturing Wheat and other Grain into Flour, by which a greater yield of flour of an improved quality may be produced from a given quantity of grain than has been produced heretofore, which is described as follows, reference being had to the annexed drawing, making part of this specification, and being a vertical section of a mill.

Before describing my improvement I will briefly explain the process now described, which is as follows, to wit: The grain, after being cleaned, is passed between the surfaces of the millstones, and by the friction imparted by them is pulverized and sent to the cooler or "first bolts" for the purpose of separating the flour from the offal. In ordinary flouring-mills it usually passes through two bolts, called "superfine" or "first merchant" bolts. The flour produced by this bolting is generally divided, by means of conveyers under them, into superfine flour and what is termed "returns." That part first produced at the "head" of the bolts is sent to the packing chest or barrel for packing, and the remainder, taken at the tail, is sent back or returned to the cooler or head of the first bolt to be again rebolted, with the view of mixing and sifting through with the superfine flour. The residuum or offal then passes from the first bolts, F, to the "lower merchant" or return bolts, E, which are covered entirely or in part with coarser cloth than is generally used on the first bolts, for the purpose of sifting out the particles of flour which is found too coarse to pass the meshes of fine cloth. The flour from these bolts is also sent back or returned to the cooler with a view to incorporate it with the superfine flour. The residuum or offal is again passed into the succeeding bolts, and the flour produced is sent back or returned, as above, to the superfine or first bolts. This process is followed until the offal reaches the bolts with suitable cloth or wire adapted to them for separating it into "middlings," "ship-stuffs," "shorts," and "bran," or into two, three, or more qualities of "stuffs," as may be desired. If separated into two qualities, it is denominated "shorts" and "bran," or "middlings" and "bran." Since the introduction of what are well known as "patent dusters," the offals are submitted to the action of them after having passed through all the ordinary bolts in the mill, when the work is regarded as perfect, with the exception of the middlings, which, it will be seen from their title, are not regarded as offal, feeds, or residuum until after being reground, which is usually done in slack times, or intervals between the regular flouring season, after which, the flour being bolted from them, they are denominated "finished middlings," "offal," or "feeds." By this process of flouring the quality of bolting-cloths used on the various bolts, though often differing in quality and relative proportions of each, is usually about No. 9 or 10 for the superfine bolts, No. 6, 7, or 8 for the lower merchant or return bolts, and No. 3, 4, or 5 for middlings, with such quality as suited for the separation of the coarser feeds or ship-stuffs, shorts, &c. Occasionally with good machinery and perfect skill the flouring process is regarded as finished without regrinding the middlings, which is then separated with the ship-stuffs or shorts, and regarded as feeds; but in most cases that material which is bolted through Nos. 3 and 4, and sometimes 5, cloth, being a coarse partially-ground flour, is submitted to a second grinding after being carefully separated from the ship-stuffs, shorts, and bran. The ship-stuffs were formerly used for navy or ship bread; but with the improved machinery now in use it has been regarded as useless for every purpose save feed for cattle, or used occasionally for distilling. By this mode of flouring, and with the most improved machinery managed with the best skill, the barrel of superfine flour is seldom produced from less than four and one-quarter bushels, and is rated to be, on an average, in first-class mills, from four and one-third to four and one-half bushels to the barrel, and by a chemical analysis of various samples of wheat-flour it appears to contain about from ten to twelve per cent. of "gluten," the amount of which is generally regarded as a good indication of the nutritive value of flour. According to Davy's Agricultural Chemistry, English Middlesex wheat contained nineteen per cent.; Sicilian wheat, twenty-three and nine-tenths; Poland, twenty, and North American twenty-two and one-half per cent., or about double the amount found in American flour. It is also observed by chemical analyses of that part of wheat which we term "bran" that it contains much more of the nutritive property of the grain than is found in superfine flour, Professor Johnston showing the amount of gluten to be more than double, while in an analysis by Millon there was shown to be in one hundred pounds of bran as follows, to wit: starch, dextrine, and sugar, fifty-three pounds; sugar of licorice, one pound; gluten of licorice, fourteen and nine-tenths pounds; fatty matter, three and six-tenths pounds; woody matter, (bran proper,) nine and seven-tenths pounds; salts, one-half pound; water, thirteen and nine-tenths pounds; aromatic principles and incrusting matter, three and four-tenths pounds. This analysis was made with one-hundred pounds of bran from a soft French wheat, which, it is well known, does not contain the amount of nutritive matter that is found in the hard varieties; yet it shows that over two-thirds of the whole amount is of a valuable nutritive material, susceptible of being made into flour, and more than one-half is the very material of which the superfine flour is composed—to wit, starch and gluten—and that the amount of the latter surpasses the average of that found in the best quality of superfine flour. Many experiments in the analysis of wheat, of flour, and bran show the same general result, only varying in proportions according to circumstances, all proving, however, conclusively that a large proportion of valuable nutritive matter, which is readily digestible and contains a large amount of the fat-forming matter and bone and muscle material, goes off with the bran and offal by imperfect manufacturing.

There seems to be considerable contrariety of opinion among chemists as to bran being a nutritive matter. Analysis, however, clearly shows that what the miller puts into the bag and calls "bran" is highly nutritive. The only question to be settled is whether what custom has denominated "bran" may not be associated with a material that is not bran proper, and which contains the nutritive matter that is found in bran as it is. This might be decided by an analysis of one hundred pounds of the outer coating of wheat or bran taken off by Bentz's process, which, if done, it would undoubtedly show that it is not of itself very highly nutritious or an indispensable article for the sustenance of human life. The actual amount or proportion of bran proper found in the wheat necessary to make a barrel of flour is so inconsiderable that its mixture with the flour could do little good and its rejection no hurt, if with it there was not rejected and lost a large amount of flour material highly nutritious by imperfection in the separation. The only injury that would follow by finely pulverizing the bran and incorporating the whole of it with the flour would be the reducing its texture or color below that standard fixed by arbitrary custom as a test of its value. Hence, as that custom must be complied with, the art in the manufacture consists in getting the greatest possible amount of the flour and nutritive property from the wheat, and rejecting just so much of the bran as will leave the texture of the former agreeable to the standard fixed by society. To do this it must be apparent that the primary and most important desideratum in manufacturing wheat into flour is perfect and uniform pulverization of all and every part susceptible of being made or that it is desirable to make into flour. Could this be done, but little judgment or skill is required to separate the flour by bolting and reject the bran; but perfect pulverization cannot be attained by one process of grinding, and the reasons are obvious when we come to examine the different constituent properties of wheat, the different proportions in each different variety, the amounts found in each variety, too, as the climate varies, mode of culture, time and manner of harvesting, and the different degrees of moisture and dryness found in each crop when delivered at market or in the mill. Then there is a great difficulty in keeping the millstones dressed and otherwise in a proper and perfectly equal condition, and their operation and effect are constantly subject to variation by motion and by the atmosphere, affecting both the grinding and bolting in their various changes. If the wheat was all in a proper and equal condition in other respects, being composed of about sixty per cent. of starch, which is soft, porous, and tender, and from sixteen to twenty-two per cent. of gluten, which is hard, tough, and elastic, there is still great difficulty in producing perfect pulverization. The gluten is located in a thi layer around the outside of the starch and immediately under the outer coating of the grain, and to which it adheres with great tenacity, and if we attempt to grind so close and fine as to divest the bran of all this valuable material and at the same time reduce it to a proper degree of fineness to sift through the bolts, the extra friction required is liable to reduce the starch too fine, to produce too much heat, which, affecting the oily or fatty mater in the grain, unites with the fine particles of starch and forms a paste, and not only glazes the millstones, but fills the meshes of the bolt-cloth and destroys or greatly retards the bolting. Flour ground in this manner may look well enough to pass inspection, but as the angular or gritty quality is too much destroyed, there is a want of what millers call "body" to it, and it is found inferior for food. If we grind high or coarse enough to preserve the good grinding property of the millstones, avoid glazing, and to preserve a good body to the meal, which insures good bolting, we cannot divest the bran and feeds or offal of the gluten, and a portion of the flour will be so unequally pulverized that coarse bolt-cloths must be used to insure a yield and to associate with the flour that desirable nutritive property which the partially-ground particles are known to contain, and which, if obtained by the use of a coarse cloth, subjects the flour to be "scratched" by letting through with the flour fine particles of bran, which hurt it only for inspection. If this coarse flour is sifted out, as it usually is, with four-fifths or No. 7 cloth, and returned back to the superfine bolts, which are covered with 8, 9, or 10 cloth, it is evident but a small portion of it passes through them and incorporates with the superfine flour, but it passes along the bolts until reaching again cloth of sufficient mesh to let it through is thus returned *ad infinitum*, overlaboring and wearing out the superfine bolts, and subsequently is thrown off with the feed or offal, making a loss of nutriment to flour and of profit to the manufacturer.

To obviate the difficulties I propose by my improved process to intercept the whole body of offal, or that which shall be equivalent, as it leaves the tail of the superfine bolts F, or at any other convenient place, and, instead of passing into the subsequent bolts, as is usual, submit it immediately and continuously to a second grinding through an auxiliary mill, A B, fitted and adapted for that purpose. By this means, the starch having been bolted out, the offal is divested of all the remaining flour material, and all the coarse particles may be pulverized to about the same degree of fineness as that bolted through the superfine bolts. The offal, thus ground to any degree of fineness desired, is thrown into the succeeding bolts, E, or flour dressers or dusters, which should be covered with fine 9 or 10 bolting cloth or material, where the flour is separated from the offal, and from the head or bolt E the best flour may be sent back or returned to the cooler or superfine bolts F, to be incorporated with the superfine or other flour, or it may be packed into a separate article of any desired quality, the flour material being by the regrinding perfectly pulverized and reduced to the same fineness of the starch. The bolt-cloth necessarily requires to be finer than that formerly used on all the bolts or dusters except the superfine and those used for dividing the offal into feeds, and from the head of each bolt or duster the flour produced should be sent back or returned, not to the cooler, as usual, but to the head of the next preceding bolt. The flour produced along the middle of each bolt should be returned to the head of the same bolt, and that sifted through at the tail of each bolt should be sent with the offal to the head of the next bolt or duster that succeeds it. By this means there is no coarse or unground flour going back to the first bolts F, as formerly. The labor on each bolt is uniform and equal, and the flour sent to the superfine bolt F from the lower merchant-bolt E, having once been bolted through No. 9 or 10 cloth, will readily pass through the superfine bolts and incorporate with the flour. This bolting, dusting, sifting, and separating may be continued to any extent desired, and if the rule above indicated is carefully observed, or that which shall be equivalent, the fine particles of bran may be perfectly separated from the flour, and the perfect pulverization of the grain will insure the greatest possible yield of a rich, nutritious article of flour, and possessing good body, and ground to an equal fineness.

The auxiliary mill A B should be adapted in size to the amount of offal to be ground, and should be fitted with care, so as to insure good, uniform, and equal feeding. They should be faced and cracked fine and smooth, with furrows of good depth about the eye, and made true and smooth also. If the common kind of stones are used, the eye in the runner should be made conical to insure good feeding, and the runner well balanced when in motion.

This process may be adapted in like manner to custom-work or common grist-grinding with equal success as in flouring or merchant work.

In grinding by this process the first grinding at C D should be done something higher or coarser than by the usual mode, so as to avoid reducing the starch contained in the wheat too fine; yet it should not be ground so coarse that the first bolting will not sift out a large proportion of the flour in the wheat, as this would throw forward too much grinding on the auxiliary mill, and both the grinding and subsequent bolting would be less perfect. All should be pulverized at C D that can be without danger of glazing the stones, clogging the bolts, or reducing any of the particles too fine, or producing too great heat. And in grinding the offal at A B care must be taken not to grind too fine. It should be ground even and fine; but if too fine the large amount of gluten and fatty matter found in the offal will glaze the stones, and it will also varnish over and clog the bolts unless judgment is used in grinding and the mills work in a proper manner.

The directions given in the foregoing specification will be readily understood by any ordinary practical miller, and it is not expected that they will be followed to the letter in every instance, but may be varied in application or similar devices resorted to, which will answer the same end, according to the condition of the mill, circumstances, and the judgment of the miller.

The advantages obtained by my process or the main features of them may be shown by presenting them in the following manner and connection.

First. As about sixty per cent. of the flour is taken from the ground meal or wheat by the first grinding and bolting, the second grinding will perfect the cleaning of the offal and pulverizing the gluten matter.

Second. The coarse particles that escape the first grinding and pass out at the tail of the first bolt with the offal being all reduced to fineness, there is none of the coarse returns sent back to the superfine-bolts F, but being reduced to flour it is bolted through 9 or 10 cloth before returning it, when it will readily incorporate with the superfine flour by bolting through the same quality of bolt-cloth—Nos. 9 and 10—generally found on the superfine-bolts.

Third. The starch and the gluten may be ground to an equal and sufficient degree of fineness without danger of reducing any of the more tender parts too fine, which insures rapid and fine bolting and a saving of the amount of bolts required.

Fourth. The granular or gritty property of the flour being preserved by enabling the miller to grind fine in the first grinding and without the usual loss of the nutritious property of the grain, it ferments more readily, will make just as white, sweeter, healthier, and better bread, and more of it to the quantity of flour, as it absorbs more liquid and bleaches better in baking.

Fifth. In grinding wet or damp wheat the first grinding must be high or coarse from necessity, and the loss sustained by the old mode is greatly reduced by grinding all the offal. The first grinding warms the product, and by passing up the elevators through the cooler and superfine bolts, the offal, by action and exposure to air, becomes partially kiln-dried, and by the auxiliary mill is divested of nearly every remaining particle of flour while in this condition without difficulty.

Sixth. It tends somewhat, by being twice ground and aired, to evaporate more of the moisture found in the grain, and renders the flour drier, and, by largely increasing the yield, adds more of the gluten found in the offal to the flour.

Seventh. It avoids any danger or necessity for glazing the stones, and, by preserving them much longer in a good condition for grinding, time and labor are saved in dressing.

Eighth. It finishes the business by a straight and continuous operation, and enables the miller to make a high "extra" article of flour from the first grinding and any desired quality from the second, all at the same time, without extra labor, and without the usual loss in wheat formerly sustained by making extra flour, but with great gain in the quantity required to the barrel.

Ninth. The mill, with this process properly adopted and managed with judgment, may produce a barrel of good superfine flour on an average grind from four bushels of good clean wheat, weighing sixty pounds to the bushel, and it has been produced from two hundred and thirty-five pounds of wheat, or three and fifty-five sixtieths bushels, leaving only thirty-nine pounds offal and loss per barrel, whereas by the old mode the offal and waste to the barrel are seldom less than fifty-nine pounds, and often from sixty-five to seventy, and in many parts of the country even more than that.

Tenth. By this process all the white varieties of wheat may be made into fancy flour, and a barrel produced from four bushels, and the same yield can be produced when making four-fifths of the flour into high extra and the rest into No. 2 S. fine or "Improved Graham," if desired.

What I claim as my invention and improvement, and desire to secure by Letters Patent, is—

The process of grinding the offal of grain immediately after it has passed from the bolts, contemporaneous with the first flouring, and by the continuous operation of machinery adapted to said process, substantially as set forth, for the purpose of increasing the quantity and improving the quality of the superfine or other flour.

In testimony whereof I have hereunto subscribed my name before two subscribing witnesses.

Done at Indianapolis this 7th day of June, 1853.

DAVID P. BONNELL.

Witnesses:
F. M. FINCH,
JAMES McCREADY.